United States Patent

[11] 3,630,672

| [72] | Inventor | John M. Potts<br>Florence, Ala. |
|---|---|---|
| [21] | Appl. No. | 807,288 |
| [22] | Filed | Mar. 14, 1969 |
| [45] | Patented | Dec. 28, 1971 |
| [73] | Assignee | Tennesee Valley Authority |

[54] USE OF POTASSIUM POLYPHOSPHATE IN SO₂ RECOVERY FROM STACK GASES
12 Claims, 4 Drawing Figs.

[52] U.S. Cl.............................................. 23/178,
23/2, 23/224
[51] Int. Cl...................................... C01b 17/56,
C01b 17/04
[50] Field of Search............................ 23/2, 131,
178, 178 S, 224

[56] References Cited
UNITED STATES PATENTS

| 1,589,133 | 6/1926 | Eustis............................ | 23/178 S |
| 2,082,006 | 6/1937 | Johnstone..................... | 23/178 S |
| 2,163,554 | 6/1939 | Gaither......................... | 23/224 X |
| 3,431,072 | 3/1969 | Rozie et al.................... | 23/178 X |
| 3,477,815 | 11/1969 | Miller et al................... | 23/178 |

FOREIGN PATENTS

| 706,449 | 11/1967 | Belgium........................ | |

Primary Examiner—Oscar R. Vertiz
Assistant Examiner—Charles B. Rodman
Attorney—Robert A. Petrusek ABSTRACT: Recovery of sulfur dioxide from stack gas consisting of scrubbing the gas with potassium polyphosphate solution to form a slurry of crystallized potassium pyrosulfite. The potassium pyrosulfite is regenerated for further pickup of sulfur dioxide by (1) heating the slurry directly, (2) separating the potassium pyrosulfite and treating it in a reflux stripper, (3) heating the potassium pyrosulfite in solid form, or (4) heating solid potassium pyrosulfite to drive off one-third of the sulfur dioxide and reducing the remaining two-thirds to form hydrogen sulfide, the sulfur dioxide and hydrogen sulfide being reacted to form elemental sulfur.

KEY:
1. STACK GAS SCRUBBER
2. STRIPPER
3. CENTRIFUGE

KEY:

1. STACK GAS SCRUBBER
3. CENTRIFUGE
4. FURNACE
4a. FURNACE
5. CLAUS UNIT

USE OF POTASSIUM POLYPHOSPHATE IN SO RECOVERY FROM STACK GASES

My invention relates to a process for sulfur oxide recovery from powerplant stack gases by scrubbing same with a potassium phosphate solution to form a reaction product slurry and more particularly to the subsequent carefully controlled treating of the slurry to ultimately recover therefrom elemental sulfur.

Powerplants in the United States emit annually about 15 million tons of sulfur dioxide, which not only constitutes a severe pollution problem but also a deplorable loss of valuable national resource. Although many approaches to solving the problem have been considered, including use of low-sulfur fuel, fuel desulfurization, gasification to make a clean fuel, and recovery from stack gases, treatment of the stack gases, for several reasons, is the most promising.

Recovery of the sulfur dioxide is, however, quite difficult because of the low sulfur dioxide concentration (0.2–0.3 percent) and the high content of moisture and dust in the stack gases. The sulfur dioxide concentration is on the order of that in sulfuric acid plant tail gas, recovery from which is not generally considered economical even though the gas is clean and dry.

Many recovery processes have been proposed. Solid absorbents such as sodium aluminate and manganese dioxide; molten alkali salts, absorbents such as activated carbon; aqueous solutions of ammonium and sodium salts; and slurries of metal oxides or hydroxides have all been considered and tested. The basic requirement is that the scrubbing operation be as simple as possible; otherwise, the tremendous volume of wet, dirty gas renders the operation uneconomical. The regeneration step, however, can be more complicated because the quantities to be handled are much lower by comparison with the stack gas itself.

Work sulfur oxide problem was started at TVA in Aug. 1952, shortly after the construction of the agency's first major coal-fired plant. With the advent of coal base power in the system and in view of the fact that much of the coal suitably located for use in the Tennessee Valley was high in sulfur content, it became obvious that sulfur oxide emission was both a problem and an opportunity. The problem—impairment of air quality—could be taken care of by high stacks. The opportunity—recovery of a national resource that was otherwise being wasted—required development of economical recovery processes.

This early work was suspended after but a few years due to the poor economic prognosis. The most logical recovery product, sulfuric acid or sulfur, was then in plentiful supply and selling at a low price—so low as to discourage in a major way any effort to recover sulfur values from a gas containing only 0.2 to 0.3 percent sulfur dioxide—lower than in the tail gas emitted from many sulfuric acid plants. In about 1963, however, a period of sulfur shortage and increasing sulfur price began and has continued to the present time. This was due, in part at least, to increasing production in the fertilizer industry which accounts for about half the sulfur consumption in this country. In making phosphate fertilizers, large tonnages of sulfuric acid—most of it made from Gulf Coast sulfur—are used in dissolving or treating phosphate rock (ore). The rapid increase in production, particularly in the 1965–68 period, exhausted sulfur inventories and induced a major world shortage with a consequent price increase from $24 per long ton in 1962 to $42 per long ton in 1968.

In this present situation, the fertilizer industry, as well as others affected by this sulfur supply, looks for other sources of sulfur. Thus, attention again was focused on powerplant stack gases as a source of sulfur. The situation was considerably different from that in the early 1950's: the rising price of sulfur had changed economics of sulfur dioxide recovery, the fertilizer industry badly needed a new source of sulfur, and a new factor had been introduced—the possibility that a permanent shortage of low-cost sulfur had developed. The last of these is particularly serious for the fertilizer industry, which has depended on cheap sulfur throughout its history even though temporary imbalances in supply and demand have brought the price up from time to time. Also, there is some indication that the easily mined sulfur deposits are nearing exhaustion and that more expensive sources, either of sulfur compounds or of lower grade elemental sulfur deposits, must be depended upon in the future. In this situation, sulfur dioxide in stack gases takes on a new importance as a national resource that should be conserved because of a dwindling low-cost reserve of elemental sulfur. Furthermore, because of the increasing size of individual powerplants, the increasing total power production, and the depletion of low-sulfur fuel supplies which necessitates burning of high-sulfur fuel, there is increased concern that the air quality problem cannot be solved completely by high stacks. The combination of this with the changed economic situation and the needs of the fertilizer industry led TVA in early 1967 to resume research on sulfur dioxide recovery.

Of the many recovery processes previously proposed and tested, it was determined that the use of alkali solutions was indeed most attractive because (1) such solutions absorb sulfur dioxide at high rates even at low concentration, (2) such solutions can be loaded to a relatively high degree, and (3) the use of a wet scrubber is a relatively simple and efficient contactor. The main drawback to the use of aqueous alkali solutions, however, is the difficulty in regenerating the loaded solution in an economical way. For example, scrubbing with ammonia solution has been studied widely but the high cost of the regeneration step either because of the high heat requirement or process complexity so far has ruled out its use. Other processes heretofore considered, in addition to the use of ammonia as a scrubbing agent, included sodium or potassium solutions followed by regeneration of the scrubber effluent to give a rich stream of $SO_2$ suitable for conversion to elemental sulfur or sulfur dioxide. For instance, in Belgium Pat. No. 706,449, Nov. 13, 1967, there is shown a process for reacting stack gases with an aqueous potassium sulfite solution in order to yield an aqueous solution of potassium bisulfite under carefully controlled temperature conditions. The resulting potassium bisulfite solution is recovered and is cooled to a temperature at which at least a part of the potassium bisulfite in the solution crystallizes in the form of potassium pyrosulfite. The resulting potassium pyrosulfite crystals are separated and heated to a carefully controlled temperature to decompose the pyrosulfite to potassium sulfite, which is returned to the process and to sulfur dioxide, in which form the sulfur is recovered. Although this process represents an advance in the art, it is fraught with many difficulties due to the extremely close temperature controls which must be maintained throughout its operation in order to ensure that the potassium bisulfite does not oxidize or disproportionate to form potassium sulfate, that potassium pyrosulfite crystallizes as desired, that sufficient $SO_2$ is expelled during regeneration, and at the same time ensure that the sulfur dioxide in the stack gas does efficiently react with the potassium sulfite. In addition, the process requires that any potassium sulfate which inadvertently forms, and this cannot be completely prevented with the process as patented, be removed from the system; otherwise, the system would become filled with potassium sulfate since it is not decomposed in the thermal regeneration step. The potassium sulfate must be disposed of by selling to benefit the economics of the process; even so, the value of the potassium as potassium sulfate is much lower than the value of the potassium fed to the process. Therefore, formation of potassium sulfate is a financial detriment to the process.

My invention is directed to a process for scrubbing sulfur dioxide from stack gases and the like by using a particular type of potassium phosphate solution, followed by regeneration of the scrubber effluent to yield a rich stream of $SO_2$ suitable for easy conversion to sulfuric acid or, in one embodiment, to elemental sulfur. In my process for $SO_2$ recovery, a particular potassium phosphate solution which was developed originally for use as a liquid fertilizer is used as the scrubbing medium.

The solution has a high enough pH for good $SO_2$ removal efficiency and the phosphate therein reduces the vapor pressure ratio of water to $SO_2$ in the stripping solution whereby it is necessary to evaporate less water in driving off the $SO_2$ to regenerate the stripping solution. Moreover, I have found that the use of this particular type of potassium phosphate solution dissolves very little of the $SO_2$ as such but rather almost immediately after absorbing $SO_2$ showers it out as potassium pyrosulfite, thereby eliminating recycling dissolved $SO_2$ back to contact with stack gases, which in turn eliminates the possibility of oxidation of dissolved $SO_2$ to the undesirable sulfate. In my tests, good $SO_2$ removal from the gas was obtained, yet practically all of it precipitated immediately in large easily separable crystals of pyrosulfite. This, of course, is a major advantage as the pyrosulfite is obtained without cooling and the capacity of the solution is not reduced by having to carry dissolved sulfite.

In my early work, potassium phosphate was selected as the absorbent because any sulfate unavoidably formed by oxidation in the process cycle would be salable as a fertilizer. In contrast, sodium phosphate would yield sodium sulfate, a contact the little value. On the other hand, ammonium phosphate was not and potassium polyphosphate in aqueous medium to form a easily. From the results of these early tests, I learned be common potassium phosphate, i.e., potassium orthophosphate, solutions could not be used because the solubility of same is too low and I observed it to precipitate along with the resulting potassium pyrosulfite. Subsequently, however, I found that I was able to accomplish my desired objectives when I used a potassium phosphate solution containing in addition to potassium orthophosphate substantial amounts of potassium polyphosphate and in particular potassium pyrophosphate.

My invention therefore is directed to the recovery of sulfur values from gases containing only trace amounts of said sulfur dioxide such as, for example, stack gases from fossil fuel fed powerplants by a process wherein I contact the sulfur dioxide containing gases with a mixture of potassium orthophosphate and potassium polyphosphate in aqueous medium to form a resulting slurry containing potassium pyrosulfite and thereafter heating the potassium pyrosulfite containing slurry to convert only about one-half or less of the total sulfur values therein (together with that represented by recycle makeup) to sulfur dioxide for recovery of same. The remaining portion of the slurry is recycled to contact with the stack gases for said $SO_2$ makeup. In other embodiments of my invention, after the sulfur dioxide recovering step, the crystalline potassium pyrosulfite is separated from the potassium phosphate solution and regenerated to potassium sulfite in a refluxing stripper or a facility for heating solids under vacuum. The regenerated potassium sulfite (solid or solution) is returned to the potassium phosphate solution for recovery of more $SO_2$. In another embodiment of the invention, after the sulfur dioxide recovering step, the crystalline potassium pyrosulfite is separated from the potassium phosphate solution, one-third of the $SO_2$ is liberated by heating and two-thirds is reduced and reacted with hydrogen to form hydrogen sulfide, the hydrogen sulfide and $SO_2$ are reacted via the Claus process to yield as product elemental sulfur, and the potassium is reacted with carbon dioxide to form potassium carbonate which is returned to the potassium phosphate solution for recovery of more $SO_2$.

In my process, I use for the starting scrubbing solution a solution containing approximately equal proportions of potassium orthophosphate and potassium pyrophosphate, or the liquid fertilizer solution of 0-27-36 produced as described in U.S. Pat. No. 3,022,154, Potts et al., assigned to the assignee of the present invention. As is noted in the disclosure of Potts, his composition of matter contains substantial amounts of potassium orthophosphate, potassium pyrophosphate and from about 5 to 11 percent potassium tripolyphosphate and up to about 2 percent potassium tetrapolyphosphate. For the purpose of my invention, I have found that it is only necessary that the 0-27-36 grade fertilizer solution contain in addition to potassium orthophosphate about an equal amount of potassium polyphosphate. Apparently the presence of the potassium polyphosphates effectively increases the solubility of the potassium orthophosphates in the presence of potassium pyrosulfite, thereby enabling my process to operate as described, whereas, if insufficient amounts of potassium polyphosphate, such as potassium pyrophosphate, are present in my scrubbing solution, I have observed that the potassium orthophosphate, because of its low solubility, is caused to precipitate along with the potassium pyrosulfite rendering such a procedure inoperable.

It is therefore an object of the present invention to provide an improved and economically attractive process for the recovery of sulfur values from gases of high moisture and dust contents and containing less than about 0.3 percent $SO_2$.

Another object of the present invention is to provide an improved and economically attractive process for the recovery of sulfur values from gases of high moisture and dust contents and containing less than about 0.3% $SO_2$ by utilizing a potassium phosphate solution containing potassium polyphosphates, which solution is characterized by the fact that it has the ability to absorb sulfur dioxide at high rates even at low concentrations of $SO_2$, which in turn readily unloads itself of dissolved $SO_2$ by dropping same out as precipitated potassium pyrosulfite.

Still another object of the present invention is to provide an improved and economically attractive process for the recovery of sulfur values from gases of high moisture and dust contents and containing less than about 0.3% $SO_2$ by utilizing a potassium phosphate solution containing potassium polyphosphates, which solution is characterized by the fact that it has the ability to absorb sulfur dioxide at high rates even at low concentrations of $SO_2$, which in turn readily unloads itself of dissolved $SO_2$ by dropping same out as precipitated potassium pyrosulfite, and wherein the sulfur dioxide is evolved by thermal decomposition of pyrosulfite either by heating the pyrosulfite without separation, or by separating the pyrosulfite and heating in a reflux stripper or in dry form. Heating without separation had the advantage over other processes of low heat requirement because of high $SO_2$ vapor pressure and low water vapor pressure which results from the presence of phosphate. Heating as a slurry in a reflux stripper has the advantage that the $SO_2:H_2O$ vapor pressure is kept at a maximum without phosphate present: the stripping solution always presents the highest possible sulfur dioxide vapor pressure due to the fact that the solid pyrosulfite is fed continuously as the stripping process proceeds thereby keeping the stripping solution saturated with the decomposable salt. Heating the solid has the advantage that there is not heat requirement for water evaporation.

A further object of the present invention is to provide an improved and economically attractive process for the recovery of sulfur values from gases of high moisture and dust contents and containing less than about 0.3% $SO_2$ by utilizing a potassium phosphate solution containing potassium polyphosphates, which solution is characterized by the fact that it has the ability to absorb sulfur dioxide at high rates even at low concentrations of $SO_2$, which in turn readily unloads itself of dissolved $SO_2$ by dropping same out as precipitated potassium pyrosulfite, and wherein one-third of the sulfur for production of elemental sulfur by the Claus process is evolved as sulfur dioxide by thermal decomposition of pyrosulfite rather than by burning hydrogen sulfide as in the usual method, thereby dictating lower reducing agent requirements than processes yielding sulfate as the absorption product, which process at the same time is characterized by the fact that any sulfate formed by unavoidable oxidation in the scrubber does not have to be separated in that it is reduced along with the sulfite when the remaining two-thirds of the sulfur is reduced to hydrogen sulfide for use sulfur the Claus process.

In carrying out the objects of my invention, I have found that after the pyrosulfite is separated from the scrubber effluent as a solid which is subsequently heated to evolve sulfur dioxide it is essential for economical operation of my process for production of elemental sulfur that only about one-third of the total sulfur value in the separated solid pyrosulfite be converted to sulfur dioxide and that the remaining two-thirds be left in the form of potassium pyrosulfite, potassium sulfite, potassium sulfate, and other sulfur compounds for reduction to hydrogen sulfide and reaction with the unreduced sulfur dioxide.

My invention, together with further objects and advantages thereof, will be better understood from a consideration of the following description taken in connection with the accompanying drawings in which.

Figure 1:
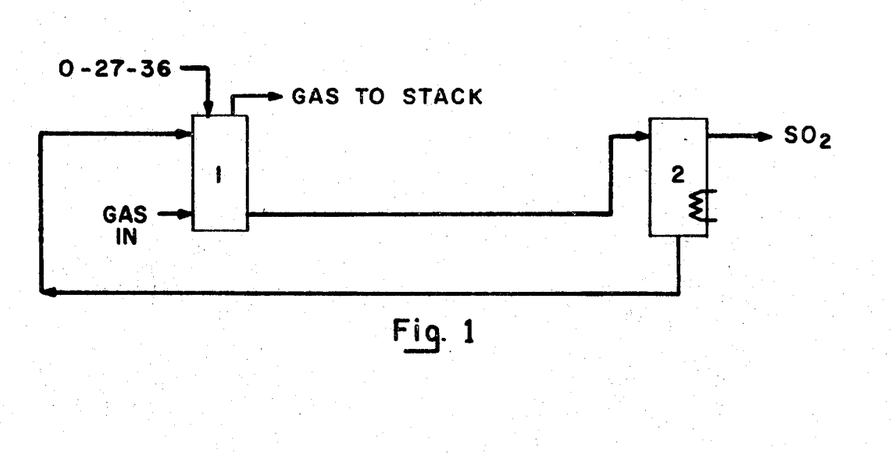
FIG. 1 is a flowsheet generally illustrating the principles of my novel process employing my first embodiment thereof titled Thermal Stripping.

Referring now more specifically to FIG. 1, in this embodiment titled Thermal Stripping, gas containing the sulfur values to be recovered such as, for instance, stack gas from fossil fuel fed powerplants, is fed to stack gas scrubber 1, together with a liquid fertilizer solution such as produced in Potts, et al., supra, and preferably a 0-27-36 grade, along with any necessary water. I believe that the reaction taking place in stack gas scrubber means 1 can be written as follows, it being understood that the 0-27-36 grade fertilizer contains both potassium pyrophosphate as well as potassium orthophosphate.

(A-1)

The resulting slurry from stack gas scrubber means 1 is sent to stripper 2 where heat applied and from which is recovered the desired $SO_2$ while simultaneously returning the unconverted portion of the slurry back to stack gas scrubber means 1. The reaction in stripper 2 can be written as follows:

(A-2)

The unreacted potassium pyrophosphate, potassium orthophosphate now in form of monoortho potassium phosphate ($KH_2PO_4$) and the potassium sulfite are returned to stack gas scrubber means 1 wherein they combine with more $SO_2$ in that portion of the stack gases introduced therein which I consider and oftentimes refer to as recycle makeup to yield additional amounts of potassium pyrosulfite according to the following equation:

(A-3)

From the above equations (A 1-3) it will be seen that of the 2 moles of $SO_2$ entering into the reactions represented thereby only 1 of the 2, to wit, one-half of the total sulfur values, can be recovered as $SO_2$ in the heating step of equation (A-2) carried out in stripper 2. In actual practice with this embodiment, the amount of $SO_2$ recovered may be considerably less than this. It will also be noted that the reactions represented by equations (A-2) and (A-3) are repeated again and again in this embodiment of the invention. It is noted that in gas scrubber means 1, the temperature when feeding stack gases from fossil fuel fed powerplants is maintained therein at about 125° F. in that 125° is the wet bulb temperature of the stack gas from the boiler. The best heat supplied to stripper 2 is sufficient to raise and maintain the temperature of the reactants shown in equation (A-2) in the range of about 230° to about 250° F. and preferably at about 250° F.

Figure 2:
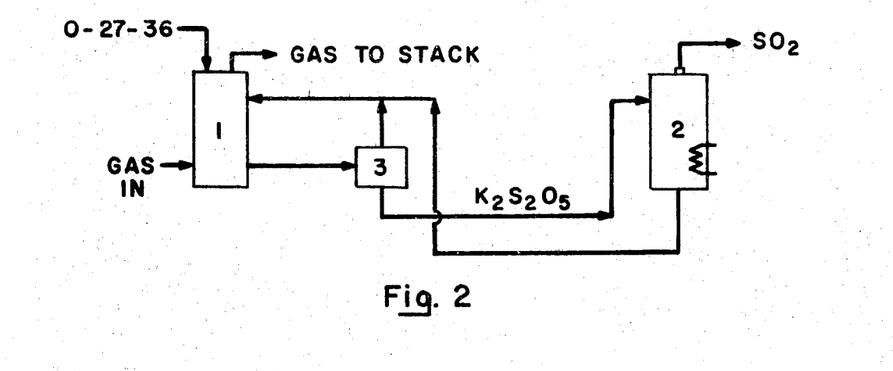
FIG. 2 is a flowsheet generally illustrating the principles of my novel process employing my second embodiment thereof titled Reflux Stripping.

Referring now more specifically to FIG. 2, in this embodiment of my invention, the same reaction occurs in stack gas scrubber means 1 as discussed in the treatment of FIG. 1 supra, with the reactants being maintained at about 125° F.

due to the effect of the wet bulb temperature of the flue gas therein and may be represented again by equation (B-1) infra.

(B-1)

The resulting slurry containing the precipitated potassium sulfite is sent to centrifuge 3 wherein the solid potassium sulfite is separated as a solid and subsequently introduced together with the required water to stripper 2 wherein the following reaction takes place:

(B-2)

In above reaction when operated at atmospheric pressure stripper 2 is maintained at a temperature of about 212° F., however, I prefer to operate stripper 2 in this embodiment of my invention at about 5 to 10 inches of mercury vacuum under which conditions the temperature maintained in stripper 2 is in the range from about 190° to about 210° F., and preferably at about 200° F.

The liquid's fraction from centrifuge 3 containing the potassium pyrophosphate and the monoortho potassium phosphate are fed back to stack gas scrubber 1 together with the solution of potassium sulfite formed in stripper 2 wherein with contact with additional sulfur dioxide the following reaction takes place.

(B-3)

Again it will be noted in this embodiment of my invention that of the 2 moles of sulfur dioxide entering into the reaction only 1 mole, i.e., one-half of the total sulfur value may be recovered by decomposition of the potassium pyrosulfite and again the actual amount may be less. As in the embodiment shown and discussed in FIG. 1 supra in this embodiment the reactions represented by equations (B-2) and (B-3) are repeated over and over again in stripper 2 and gas scrubber 1, respectively, while, of course, makeup 0-27-36 grade liquid grade fertilizer is fed to gas scrubber means 1 to continue the reaction represented by equation (B-1).

Figure 3:
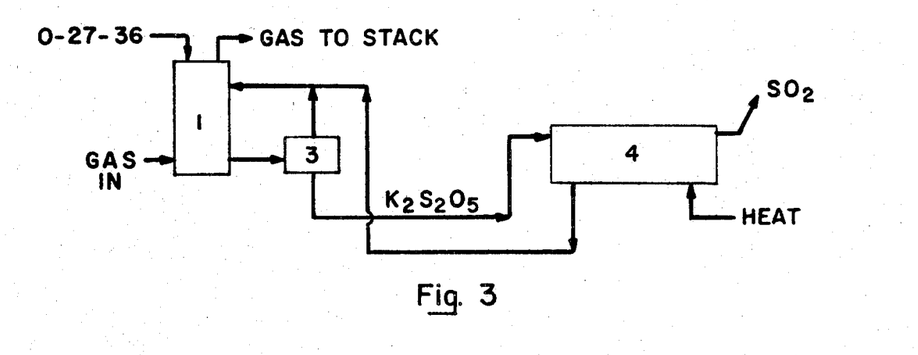
FIG. 3 is a flowsheet generally illustrating the principles of my novel process employing my third embodiment thereof titled Solids Regeneration.

Referring now more specifically to FIG. 3, again in this embodiment of my invention the reaction in gas scrubber means 1 begins with the addition of the potassium pyrophosphate containing potassium phosphate solution to gas scrubber means 1, together with the gas to be scrubbed and water and is represented by the following equation:

(C-1)

As in the other embodiments of my invention, supra, the wet bulb temperature of the flue gas dictates that this reaction is maintained at about 125° F. The resulting slurry containing the precipitated potassium pyrosulfite is sent to centrifuge 3 wherefrom the solids portion is sent to furnace 4 without the addition of water and wherein the solid potassium pyrosulfite is heated carefully, so as to minimize on the formation of any sulfate, at a temperature in the range from about 350° to about 450° F. at 25 inches of mercury vacuum and preferably at this vacuum at about 400° F. This reaction is represented (C-2)

The liquid fraction from centrifuge 3 containing the potassium pyrophosphate and the monoortho potassium phosphate is sent back to gas scrubber means 1 along with the potassium sulfite residue formed in furnace 4 wherein these materials in contact with additional sulfur dioxide react to form still more potassium pyrosulfite as represented by the equation (C-3)

Again as in embodiments shown in FIGS. 1 and 2 supra, the temperature is maintained in the gas scrubber means 1 at about 125° F. due to the dewpoint of the flue gas introduced therein and in addition again equations (C-2) and (C-3) in this embodiment are repeated over and over in furnace 4 and gas scrubber means, respectively, while simultaneously additional 0-27-36 grade liquid fertilizer containing the potassium pyrophosphate as well as potassium orthophosphate is added to gas scrubber means 1 and reacts according to equation (C-1), supra. Again it will be noted that in this embodiment of my invention only 1 or less of the 2 moles of sulfur dioxide which are added to the reactions therein is recovered by heating and decomposing the potassium pyrosulfite.

Figure 4:
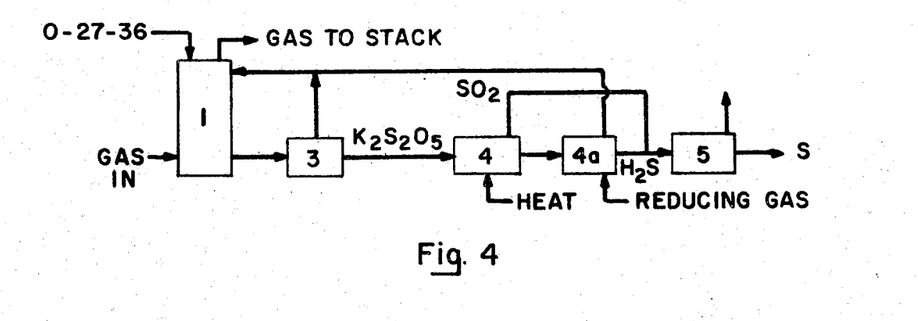
FIG. 4 is a flowsheet generally illustrating the principles of my novel process employing my fourth embodiment thereof titled Conversion to Elemental Sulfur.

Referring now more specifically to FIG. 4, in this embodiment of my invention I realize the conversion of the sulfur values as $SO_2$ in stack gases and the like ultimately to elemental sulfur. As in the other embodiments of my invention the initial reaction in gas scrubber means 1 effects the formation of potassium pyrosulfite by introducing therein the potassium pyrophosphate containing potassium phosphate solution together with water and $SO_2$ containing stack gas and is represented by the following formula.

$$3K_4P_2O_7 + 6K_2HPO_4 \cdot 3H_2O + 6SO_2 \rightarrow 3K_4P_2O_7 + 6KH_2PO_4 + 3K_2S_2O_5 \downarrow \quad (D-1)$$

The above reaction, as in my other embodiments, is controlled at a temperature of about 125° F. at atmospheric pressure by the wet bulb temperature of the stack gases or the like introduced therein. The resulting slurry containing the potassium pyrosulfite is sent to centrifuge 3 from whence the solids portion therein containing precipitated potassium pyrosulfite is sent to furnace 4 wherein the solid material is very carefully heated at atmospheric pressure or under vacuum in the range from about 350° to about 450° F., and preferably at 400° to 420° F. to decompose only a portion of the potassium pyrosulfite resulting in yielding sulfur values as $SO_2$ and without forming any appreciable amounts of sulfate. This reaction is represented as shown in the following equation.

$$3K_2S_2O_5 \rightarrow K_2S_2O_5 + 2K_2SO_3 + 2SO_2 \uparrow \quad (D-2)$$

The solid residue formed in furnace 4 comprising the undecomposed potassium pyrosulfite and the resulting potassium sulfite are sent to furnace 4a wherein these materials are reacted under reducing conditions with carbon monoxide in the presence of hydrogen, or preferably coke or coal carbon to provide these gases, at atmospheric pressure and in the temperature range from about 900° to 1,500° F. and preferably at 1,400° F. to form potassium sulfide, hydrogen sulfide, and carbon dioxide. This reaction in furnace 4a is represented by equation (D-3) infra.

$$K_2S_2O_5 + 2K_2SO_3 + 11CO + H_2 \rightarrow 3K_2S + H_2S\uparrow + 11CO_2\uparrow \quad (D-3)$$

The resulting potassium sulfide, hydrogen sulfide, and carbon dioxide is then combined with water and heated at a lower temperature, i.e., 750° to 850° F., preferably 800° F., at atmospheric pressure to form potassium carbonate, hydrogen sulfide and carbon dioxide. This reaction may take place in a separate furnace not shown, or preferably in another portion of furnace 4a, i.e., the reaction represented by equation (D-3) taking place in the first portion of furnace 4a and the reaction just described taking place in the second or latter portion of furnace 4a which reaction is represented by equation (D-4) infra.

$$3K_2S + H_2S + 11CO_2 + 3H_2O \rightarrow 3K_2CO_3 + 4H_2S\uparrow + 8CO_2\uparrow \quad (D-4)$$

Subsequently, the sulfur dioxide derived from the reaction in furnace 4 represented by equation (D-2) is combined with hydrogen sulfide, as shown in equation (D-4) supra, and preferably from the second portion of furnace 4a, together with the carbon dioxide formed therein into Claus unit 5 which is operated at atmospheric pressure at about 400°–700° F. to form elemental sulfur along with water vapor and additional carbon dioxide according to the Claus equation represented by equation (D-5) infra.

$$2SO_2 + 4H_2S + 8CO_2 \rightarrow 6S + 4H_2O\uparrow + 8CO_2\uparrow \quad (D-5)$$

Again at this point it will be noted that of the 6 moles of $SO_2$ fed to the reactions represented by equations (D-1) and (D-2) only one-third of the total sulfur value was derived therefrom as sulfur dioxide. The potassium carbonate formed in the second portion of furnace 4a is combined with the unreacted potassium pyrophosphate and monoortho potassium phosphate left over from the reaction represented by equation (D-1) by recycling these materials back to gas scrubber means 1 wherein they are contacted with additional stack gases containing more $SO_2$ to effect the formation of additional potassium pyrosulfite. This reaction is represented by formula (D-6) infra.

$$3K_4P_2O_7 + 6KH_2PO_4 + 3K_2CO_3 + 6SO_2 \rightarrow 3K_4P_2O_7 + 6KH_2PO_4 + 3K_2S_2O_5 \downarrow + CO_2\uparrow \quad (D-6)$$

In addition to the reaction represented by equation (D-1) being repeated in gas scrubber means 1, the reactions represented by equations (D-2) through (D-6) will be repeated over and over as the material is recycled to the process. However, for a clear understanding of the recycle, the repetition of these equations may be thought of as in the following order: (D-2), (D-3), (D-4), (D-5), (D-6), (D-2), (D-3).

In a variation of this embodiment of my invention, I have found that I can reduce the temperature level required during the reduction step (D-3) by carrying along some alumina or silica in the system. Thus, if it is desired to help reduce the temperature level required in the reduction step, the reaction of alumina, for instance, acting therein may be represented as follows:

$$K_2S_2O_5 + Al_2O_3 + 6H_2 \rightarrow 2KAlO_2 + 2H_2S + 4H_2O \quad (D-7)$$

I have found that this reaction can be carried out at lower temperatures than the reaction represented by equation (D-8) infra.

$$K_2S_2O_5 + 6H_2 \rightarrow K_2O + 2H_2S + 4H_2O \quad (D-8)$$

Inasmuch as the potassium aluminate is quite soluble it can be dissolved in the scrubber liquor. On recycling it reacts with sulfur dioxide again as represented by equation (D-9) infra.

$$2KAlO_2 + 2SO_2 \rightarrow K_2S_2O_5 + Al_2O_3 \quad (D-9)$$

The $Al_2O_3$ precipitates along with the pyrosulfite and is carried along to the reduction step.

In order that those skilled in the art may better understand how the present invention can be practiced, the following examples are given by way of illustration and not by way of limitation.

EXAMPLE I

In exploratory scrubbing test with simulated stack gas, potassium polyphosphate solution (nominal 0–27–36 grade liquid fertilizer with about 60 % of the $P_2O_5$ in polyphosphate form) removed essentially all of the sulfur dioxide. Also, unexpectedly, a coarse, crystalline solid, which was identified as potassium pyrosulfite ($K_2S_2O_5$, the dehydrated form of potassium bisulfite), formed in the scrubber solution. Further tests were made in which various dilutions of 0–27–36 were used to scrub simulated flue gas. The pH of the scrubbing solution was 11.4 at the start of each test and the scrubbing temperature was 125° F. This is the approximate wet bulb temperature of typical steam powerplant stack gas and is the temperature to which stack gas could be cooled by water evaporation in a scrubbing process. In the first test, simulated stack gas containing 0.38 percent sulfur dioxide was scrubbed with undiluted 0–27–36 until sulfur dioxide removal dropped below 90 percent due to thickening of the crystal slurry; this occurred in about 20 hours. To save time in subsequent tests, pure sulfur dioxide was bubbled into the solutions initially, and then the solutions were tested with simulated stack gas for a short time to determine scrubbing efficiency. The sulfur dioxide content of the gas was determined by infrared analysis. The gas was prehumidified at 125° F. to avoid change in water content of the absorbent during scrubbing. Scrubbing was carried out in laboratory gas-scrubbing bottles. At the conclusion of each test, the liquor and crystals were separated by filtration and submitted for analyses. The results of the tests are tabulated in table I below.

TABLE I

Recovery of $SO_2$ from Simulated Stack Gas:[a]

Use of 0–27–36 Liquid Fertilizer[b] as the Absorbent

| Test No. | 1 | 2 | 3 |
|---|---|---|---|
| 0–27–36 used | | | |
| Grams of solution | 894 | 447 | 89 |

| | | | |
|---|---|---|---|
| Water added, ml. | 0 | 50 | 50 |
| Volume, final, ml. | 500 | 300 | 100 |
| $K_2HPO_4$, g.[c] | 612 | 306 | 61 |
| Scrubbing | | | |
| $SO_2$ absorbed, g. | 226[a] | 85 | 23 |
| % of theoretical[e] | 100 | 76 | 104 |
| Time to 10% breakthrough, hr. | 20 | —[f] | —[f] |
| pH, final | 7.1 | 6.0 | 3.1 |
| Filtrate | | | |
| Volume, ml. | 220 | 223 | 82 |
| Specific gravity, g./ml. | 1.7 | 1.6 | 1.4 |
| Specific gravity, g./ml. | 1.7  1.6 | | 1.4 |
| $K_2O$ | 453 | 405 | 252 |
| $P_2O_5$ | 365 | 353 | 235 |
| Sulfur | | | |
| Total | 32 | 38 | 64 |
| Sulfite | 28 | 37 | 61 |
| Oxidation of $SO_2$, % | 12 | 3 | 5 |
| Residue | | | |
| Grams | 560 | 192 | 38 |
| Analysis, % by wt. | | | |
| $K_2O$ | 42 | 35 | 32 |
| $P_2O_5$ | 12 | 12 | 7 |
| Sulfur | | | |
| Total | 19 | 15.7 | 18 |
| Sulfite | 15 | 13.3 | 17 |
| Oxidation of $SO_2$, % | 21 | 15 | 6 |
| $SO_2$ recovery, % | 100 | 91 | 104 |
| In filtrate | 6 | 20 | 45 |
| In residue | 94 | 71 | 59 |

[a] Contained 0.38% $SO_3$, nominally.

[b] Total $P_2O_5$, 26.55%: $P_2O_5$ as ortho, 10.45%: $K_2O$, 36.95%. The pH of the original solution in each test was 11.4. After scrubbing, crystals were separated from liquor by filtration.

[c] All $P_2O_5$ expressed as ortho.

[d] Calculated, based on chemical analyses of absorption products.

[e] According to the equation: $2K_2HPO_4 + 2SO_2 = 2KH_2PO_4 + K_2S_2O_5$.

[f] To save time, pure $SO_2$ was first bubbled in and the solution was then exposed to simulated stack gas briefly. In test 2, the solution absorbed 75% of the $SO_2$ in the simulated stack gas; in test 3, $SO_2$ was stripped from the solution.

In test 1, a 500-milliliter batch of undiluted 0–27–36 grade liquid fertilizer (894 g.) was used. As indicated earlier, the absorbent removed over 90 percent of the sulfur dioxide in the stack gas for 20 hours (10 percent breakthrough time). At this time the slurry had become too thick from crystallization of potassium pyrosulfite to contact the gas properly; the pH of the liquor at this point was 7.1. The absorption products contained 226 grams of sulfur dioxide, which was 100 percent of the theoretical amount to form $KH_2PO_4$ and $K_2S_2O_5$ with the 0–27–36 used. Nearly all (94 percent) of the absorbed sulfur was recovered in the crystallized potassium pyrosulfite; about 20 percent was oxidized to the sulfate form.

When 250 milliliters of 0–27–36 (447 g.) was diluted with 50 milliliters of water (test 2), the slurry remained fluid after it had absorbed 85 grams of sulfur dioxide (76 percent of theoretical). The pH of the liquor was 6.0 and the slurry removed 75 percent of the sulfur dioxide when tested with simulated stack gas; 70 percent of the recovered sulfur was in the crystalline potassium pyrosulfite.

In test 3, 23 grams of sulfur dioxide (104 percent of theoretical) was absorbed in a still more dilute solution of potassium polyphosphate (89 g. of 0–27–36 and 50 ml. of water). The pH of the solution formed was 3.1 and it gave up sulfur dioxide to the simulated flue gas rather than absorb it. Cooling was necessary to obtain a significant amount of solids; only about 60 percent of the recovered sulfur was in the solids separated after cooling to room temperature (80° F.).

The results of these tests indicate that it should be possible to remove essentially all of the sulfur dioxide from stack gas by scrubbing with potassium phosphate solution and to recover most of it as a precipitate of crystalline potassium pyrosulfite. Dilution below the 0–27–36 concentration does not seem desirable because less of the sulfur dioxide is obtained in solid form.

EXAMPLE II

Semicontinuous scrubbing tests were made in pilot-plant equipment. The scrubber solution was recycled through a 7-inch diameter by 24-inch high scrubber containing about 6 inches of packing (1¼ in. diameter rubber balls). Stack gases were prepared by burning a mixture of fuel oil and carbon disulfide to provide 3,000 to 4,000 parts per million of sulfur dioxide in the gas fed to the scrubber (cocurrent flow). The initial scrubbing solution was 0–27–36 liquid fertilizer. Semicontinuous operation was extended over 4 days of operation with removal of solids during and after each day of operation and with recycle of the filtrate. More 0–27–36 was added as required to maintain a sufficient volume of liquor for recycle through the scrubber. The scrubber was inefficient and removal of sulfur dioxide was only 54 to 70 percent due to poor distribution of the somewhat viscous scrubbing solutions; good recovery would be expected with a more suitable scrubber. At a sacrifice to efficiency, the pilot-plan scrubber was designed for trouble free operation with slurries. For larger scale operation, scrubbers are available to provide both trouble free operation and high efficiency. Of the total sulfur recovered, 60 to 66 percent was in the separated solids and was present mainly as potassium pyrosulfite; only 4 to 16 percent of the sulfur removed as solids was oxidized to sulfate form.

EXAMPLE III

Other tests similar to those in example I were made in which simulated stack gas was scrubbed with dipotassium orthophosphate solutions. A series of about 10 tests was made to cover a range in concentrations from about 35 to 65 percent by weight of $K_2HPO_4$. The less concentrated solution did not form crystals until cooled; the more concentrated solutions formed crystals at the scrubbing temperature of 125° F. However, all of the crystals formed contained a high percentage of phosphate. This indicates that the solubility of orthophosphates is too low to allow the crystallization of pure potassium pyrosulfite and emphasizes the importance of having polyphosphates in the scrubber solution.

EXAMPLE IV

As indicated in the first embodiment of my invention, the slurry formed in the scrubbing step can be regenerated by thermal stripping. Some sulfur dioxide can be driven off by heat for use as the source of sulfur in a sulfuric acid plant or for any other desired use, and the stripped solution can be recycled for pickup of more sulfur dioxide. As an example, slurry formed by pickup of sulfur dioxide in undiluted 0–27–3 6 can be heated at 248° F. (atmospheric pressure) to drive off sulfur dioxide; after 85 minutes, the total weight loss is about 7.5 percent. Included in this weight loss is about 17.5 percent of the sulfur dioxide that was originally present in the slurry. For each pound of sulfur dioxide driven off, only 1.5 pounds of steam is expelled; this small amount of steam would result in a considerable saving in heat requirement for regeneration as compared to other scrubbing processes. In this example, little more than 1.5 pounds of steam per pound would be required per pound of sulfur dioxide for regeneration, as compared to 4 to 12 pounds for ammonia scrubbing and 12 to 20 pounds for sodium sulfite scrubbing.

EXAMPLE V

In the manner of example IV, slurry formed by pickup of sulfur dioxide in 0–27–36 diluted with 9 percent by weight of water can be heated to drive off sulfur dioxide. After 85 minutes at 248° F., the total weight loss is about 20 percent. With the more dilute solution, more steam is driven off and this carries along more sulfur dioxide. By this means, the amount of sulfur dioxide driven off can be increased to about 30 percent. The steam amounts to about 2.5 pounds per pound of sulfur dioxide, but this still compares favorably with other scrubbing processes in regard to heat requirements for regeneration.

EXAMPLE VI

Results of exploratory tests to investigate the feasibility of the refluxing stripper (embodiment No. 2) are shown below. Open heating tests were made at 125° and 200° F. with slurries made by adding enough potassium pyrosulfite to water to give saturation and excess crystals. In the first test (see table II below), 75 grams of solids was added to 100 grams of water in an open vessel; an estimated 2 grams of solids remained undissolved. During the heating step, 5.1 grams of material was lost. Calculations based on chemical analysis of the solution and a $K_2O:S$ balance indicated that approximately half of the loss was sulfur dioxide with the remainder presumed to be water. Further calculations based on the assumption that all of the S and $K_2O$ was tied up as either $K_2S_2O_5$ or $K_2SO_4$ indicated that 94 percent of the sulfur was in sulfite form, or that 6 percent was oxidized during the heating step.

The solution remaining after sampling in the above test was heated further to 200° F. and an additional 25 grams of potassium pyrosulfite was added during the heating step. A weight loss of 16 grams occurred during the heating step the solution remaining weighted 172 grams. Of the total 21 grams lost during both steps of heating, chemical analysis of the solution and a $K_2O:S$ balance indicated 4.4 grams (or about 8 percent) of the $SO_2$ was lost from the solution. If all the S and $K_2O$ were combined as either $K_2S_2O_5$ or $K_2SO_4$, 91 percent of the sulfur in the solution was in the sulfite form or overall oxidation of 9 percent.

A new slurry was prepared containing 100 grams of potassium pyrosulfite and 100 grams of water. The slurry was heated in a vessel open to the air only through a water-cooled condenser; the test was to determine if sulfur dioxide could be driven off while condensing water directly back to the system. A weight loss of only 5.4 grams occurred after refluxing for 90 minutes at about 225° F. Assuming the entire loss was sulfur dioxide, only 9.4 percent of the sulfur was evolved in this manner. Perhaps more could be recovered if the gases were passed through a refluxing tower and then the condensate were returned to the bottom of the tower. Calculations based on the assumption that all the S and $K_2O$ were combined as either $K_2S_2O_5$ or $K_2SO_4$ indicated that only 81 percent of the sulfur was in a sulfite form; the more rigorous conditions apparently promoted oxidation.

TABLE II

Heating Slurries of Potassium Pyrosulfite

To Recover Sulfur Dioxide:

Exploratory Tests

|  | Open heating At 125° F. | At 200° F. | Reflux heating at 225° F. |
|---|---|---|---|
| Solution preparation, g. |  |  |  |
| Solution from previous test | 0.0 | 163.2 | 0.0 |
| Water | 100.0 | 0.0 | 100.0 |
| Potassium pyrosulfite | 75.0 | 25.0 | 100.0 |
| Total | 175.0 | 188.2 | 200.0 |
| Total weight after test, g. | 169.9 | 172.2 | 194.6 |
| Total weight loss | 5.1 | 21.1 | 5.4 |
| Loss as $SO_2$ | 2.4[a] | 4.4[a] | 5.4[b] |
| % $SO_2$ lost | 5.3 | 8.0 | 9.4 |
| Composition by chemical analysis, g./l. |  |  |  |
| $K_2O$ | 262.0 | 365.0 | 316.0 |
| Total S | 169.0 | 228.5 | 181.00 |
| Total S added,[c] g./l. | 178.4 | 248.5 | 215.1 |
| Total S lost or unaccounted for | 9.4 | 20.0 | 34.1 |
| % of total S lost or unaccounted for | 5.3 | 8.0 | 15.9 |
| Form of S remaining in solution, % |  |  |  |
| Sulfite | 94.4 | 91.2 | 81.2 |
| Sulfate | 5.6 | 8.8 | 18.8 |

[a] Calculated from total S lost as indicated below.
[b] Assuming all of weight loss was $SO_2$.
[c] From $K_2O$ analysis and ratio of $K_2O:S$ assuming all $K_2O$ added as $K_2S_2O_5$.
[d] Assuming all S and $K_2O$ combined either as $K_2S_2O_5$ or as $K_2SO_4$.

The results of these tests show that reflux stripping may be a feasible method of regenerating potassium pyrosulfite separated from stack gas scrubber effluent. Calculations indicate that about 1 to 5 pounds of steam would be required per pound of sulfur dioxide for regeneration, as compared to 4 to 12 pounds for ammonia scrubbing and 12 to 20 pounds for sodium sulfite scrubbing. The high concentration in the potassium pyrosulfite slurry is a considerable advantage as compared to the relatively weak solutions of ammonium or sodium sulfite-bisulfite. The oxidation during stripping could be a problem; however, oxidation inhibitors may be effective in such a system.

EXAMPLE VII

The potassium pyrosulfite for tests on solids regeneration (embodiment No. 3) was prepared by bubbling pure sulfur dioxide into 0–27–36 liquid fertilizer. Sufficient water was added to maintain a slurry and permit reduction of the pH from 11.9 to 5.9. The heavy precipitate formed (45–50 percent solids) was recovered by filtration and analyzed; petrographic examination indicated that it was essentially all potassium pyrosulfite. For all tests reported, 25 grams of the moist precipitate was heated in an oven for an hour at the temperatures indicated in the table. Four of the reported tests were with samples placed on watch glasses for heating; for the remaining tests, samples were placed in flasks with about 28 inches mercury of vacuum. After heating, the samples were submitted for petrographic identification and for chemical analyses. Results of the tests are shown in table III.

In open heating tests, only 8 percent of the total sulfur was driven off at 350° F. in an hour of heating, and about 25 percent of the sulfur remaining in the solids was oxidized to the sulfate form. It was necessary to increase the temperature to 400° F. (increments of 25° F.) in order to get a major evolution (52 percent) of the sulfur dioxide; at this temperature level, oxidation was 81 percent. At 425° F. no more sulfur dioxide was driven off and oxidation was 90 percent. In other tests at lower temperatures, not shown, insufficient sulfur dioxide was driven off for a practical process; others at higher temperatures (up to 700° F.) indicated that the maximum sulfur dioxide removal was about 57 percent with essentially complete oxidation of the remaining sulfur to the sulfate form.

In the vacuum-heating series, the results appear to be somewhat anomalous since there was no indication of sulfur oxide being driven off below 370° F., whereas 8 percent was evolved at 350° F. without vacuum. However, the tests were encouraging since the indicated oxidation of the remaining sulfur was only 6.6 to 22.7 percent for the temperature range of 360° to 410° F. as compared with 25 percent at 350° F. when vacuum was not used. In general, the tests indicated a gradual increase in sulfur dioxide evolution from zero percent at 360° F. to 29 percent at 410° F. The major phase remaining in the solids was identified as potassium pyrosulfite, with a minor phase of dihydrogen phosphate and a very minor phase of potassium sulfate.

TABLE III.—RECOVERY OF SULFUR DIOXIDE FROM POWER PLANT STACK GAS: THERMAL DECOMPOSITION OF K₂S₂O₅

| Test No | Open heating a | | | | Vacuum heating b | | | | | |
|---|---|---|---|---|---|---|---|---|---|---|
| | 1 | 2 | 3 | 4 | 5 | 6 | 7 | 8 | 9 | 10 |
| Maximum temperature, °F.c | 350 | 375 | 400 | 425 | 360 | 370 | 380 | 390 | 400 | 410 |
| After heating: d | | | | | | | | | | |
| Sample weight, g | 19.6 | 18.8 | 16.1 | 16.3 | 19.0 | 19.0 | 18.5 | 18.1 | 17.8 | 17.0 |
| Analysis, percent by weight: | | | | | | | | | | |
| $K_2O$ | 42.4 | 43.5 | 50.5 | 48.4 | 42.5 | 42.8 | 43.8 | 43.4 | 44.7 | 46.6 |
| $P_2O_5$ | 17.7 | 17.9 | 20.9 | 22.8 | 18.8 | 19.1 | 20.1 | 20.7 | 21.1 | 22.5 |
| Sulfur, total | 17.1 | 16.7 | 11.0 | 11.5 | 16.6 | 16.2 | 15.6 | 15.1 | 14.5 | 13.2 |
| As sulfate | 4.1 | 4.4 | 8.9 | 10.4 | 1.1 | 1.9 | 1.7 | 2.0 | 2.2 | 3.0 |
| Oxidation of S, percent | 25.0 | 26.3 | 80.9 | 90.4 | 6.6 | 11.7 | 10.3 | 13.2 | 15.2 | 22.7 |
| pH of residue | 5.5 | 5.8 | 7.1 | 6.6 | 5.9 | 6.0 | 6.1 | 6.1 | 6.3 | 6.5 |
| Weight loss during heating, g | 5.4 | 6.2 | 8.9 | 8.7 | 6.0 | 6.0 | 6.5 | 6.9 | 7.2 | 8.0 |
| Loss, percent | 21.6 | 24.8 | 35.6 | 34.8 | 24.0 | 24.0 | 26.0 | 27.6 | 28.8 | 32.0 |
| Recoveries in residues, percent: | | | | | | | | | | |
| Sulfur | 92 | 86 | 48 | 51 | 100 | 98 | 92 | 87 | 82 | 71 |
| $K_2O$ | 99 | 98 | 97 | 94 | 98 | 99 | 99 | 96 | 97 | 96 |
| $P_2O_5$ | 100 | 97 | 97 | 106 | 91 | 93 | 95 | 96 | 96 | 98 |
| Indicated S volatilization, percent | 8 | 14 | 52 | 49 | 0 | 2 | 8 | 13 | 18 | 29 | a A 25-gram sample heated on a watch glass in oven for 1 hour; sample analysis: 33.5% $K_2O$, 14.0% $P_2O_5$, 14.6% total S, 0.5% sulfate S.
b A 25-gram sample heated in a flask with 28 inches Hg vacuum for 1 hour; sample analysis: 32.9% $K_2O$, 15.7% $P_2O_5$, 12.6% total S, 1.3% sulfate S (reanalysis about 30 days after tests completed).
c Sample held at indicated temperature for 1 hour.
d At lower temperatures (unreported tests), samples contained $K_2S_2O_5$ and $KH_2PO_4$; for the open heating tests shown, crystals were too small to be identified; those from the vacuum tests were identified as mostly $K_2S_2O_5$; at higher temperatures (unreported tests), the major phase was $K_2SO_4$.

EXAMPLE VIII

As indicated in the fourth embodiment of my invention, potassium pyrosulfite can be separated from the slurry formed in the scrubbing step, and all of the sulfur contained in the potassium pyrosulfite can be converted ultimately to elemental sulfur. One-third of the sulfur can be driven off as sulfur dioxide by heating as in embodiment No. 3, the remaining two-thirds can be reduced to hydrogen sulfide, and the two gases, sulfur dioxide and hydrogen sulfide, can be reacted to form elemental sulfur. As an example of the reduction step, the reside after heating to remove one-third of the sulfur as sulfur dioxide can be reacted at 1,400° F. with coal, coke, carbon monoxide, or hydrogen to convert essentially all of the sulfur to sulfide form. At this temperature, a retention time of about 30 minutes is required. Coal is a preferable form of reducing agent since it is cheap and since it results in the formation of both carbon dioxide and steam as products of the reduction reaction. Both of these products are needed in the next step of the process. The amount of reducing agent required is at least that stoichiometrically required for the formation of carbon dioxide and steam. Potassium sulfide formed in the reduction reaction, along with the carbon dioxide and steam, are cooled to 800° F. where they react to form potassium carbonate and hydrogen sulfide. The potassium carbonate is separated as a solid and returned to the stack gas scrubber for absorption of more sulfur dioxide. The gas mixture containing the hydrogen sulfide is reacted at about 550° F. with the sulfur dioxide driven off in the heating step to form elemental sulfur. Thus, all of the sulfur removed from the stack gas is crystallized as potassium pyrosulfite and separated into two streams which are ultimately reacted to form elemental sulfur.

EXAMPLE IX

The reduction step can be carried out as in example VII except at lower temperatures, for example at 900° F. Possible advantages in carrying out the reduction step AT 900° F. as compared to 1,400 F. are (1) a savings in heat requirement, and (2) avoiding a change from solid to molten state. A disadvantage at the lower temperature is a lower reaction rate. For example, after 2 hours exposure to carbon monoxide at 900° F., one-fourth of the sulfur in the residue from the heating step remained in unreduced form. Undoubtedly, further exposure would have resulted in a greater degree of reduction; however, the more rapid reaction which occurs at the higher temperature is likely to be preferable.

What I claim as new and desire to secure by Letters Patent of the United States is:

1. A process for efficiently and economically recovering the sulfur values from the stack gases of fossil fuel fed powerplants and the like, said stack gases containing substantial amounts of fly ash, dust, and moisture, and only nominal amounts of sulfur values as $SO_2$ which comprises the steps of
   1. contacting said stack gases in a stack gas scrubber with an aqueous solution of potassium phosphate, said potassium phosphate solution containing at least about one-third of its potassium values as potassium pyrophosphate;
   2. maintaining the temperature in said stack gas scrubber means at about 125° F.;
   3. removing from said stack gas scrubber means the resulting slurry containing precipitated potassium pyrosulfite and introducing said resulting slurry into a gas stripper means, while maintaining the temperature therein in the range from about 230° F. to about 250° F. thereby effecting the decomposition of the potassium pyrosulfite therein to potassium sulfite and vapors of sulfur dioxide;
   4. recovering from said gas stripper means the sulfur dioxide vapor as product, and
   5. recycling the unreacted potassium pyrophosphate, potassium monoorthophosphate, together with the resulting potassium sulfite in said gas stripper means back to said gas scrubber means for contact with additional sulfur dioxide in said stack gases continuously introduced therein.

2. The process of claim 1 wherein the temperature in said gas stripper means is maintained at about 248° F.

3. A process for efficiently and economically recovering the sulfur values from the stack gases of fossil fuel fed powerplants and the like, said stack gases containing substantial amounts of fly ash, dust, moisture, and only nominal amounts of sulfur values as $SO_2$ which comprises the steps of
   1. contacting said stack gases in a stack gas scrubber means with an aqueous solution of potassium phosphate, said potassium phosphate solution containing at least about one-third of its potassium values as potassium pyrophosphate;
   2. maintaining the temperature in said stack gas scrubber means at about 125° F.;
   3. removing from said stack gas scrubber means the resulting slurry containing precipitated potassium pyrosulfite;
   4. separating the precipitated potassium pyrosulfite from said slurry and recycling the liquid fractions of said slurry containing potassium pyrophosphate and potassium monoorthophosphate back to said stack gas scrubbing means for contact with additional sulfur dioxide in said stack gases introduced thereinto, together with potassium sulfite formed in step (6) infra;
   5. introducing said separated precipitated potassium pyrosulfite, together with 10 moles of water for each mole of said potassium pyrosulfite into gas-stripping means;

6. maintaining the materials in said gas-stripping means at atmospheric pressure and at a temperature of about 212° F. to effect the decomposition of said potassium pyrosulfite to potassium sulfite, sulfur dioxide, and water; and 7. recovering from said gas stripping means as product the resulting sulfur dioxide vapors.

4. The process of claim 3 wherein the materials in said gas stripping means are maintained under a vacuum of about 5–10 inches of mercury and at a temperature of about 190°–210° F.

5. The process of claim 4 wherein the temperature maintained in said gas stripper means is about 200° F.

6. A process for efficiently and economically recovering the sulfur values from the stack gases of fossil fuel fed power plants and the like, said stack gases containing substantial amounts of fly ash, dust, moisture, and only nominal amounts of sulfur values as $SO_2$, which comprises the steps of:

1. contacting said stack gases in a stack gas scrubber means with an aqueous solution of potassium phosphate, said potassium phosphate solution containing at least about one-third of its potassium values as potassium pyrophosphate;
2. separating from the slurry formed in said gas scrubber means as the solid portions thereof the potassium pyrosulfite and returning the liquid portion of said slurry containing unreacted potassium pyrophosphate and potassium monoorthophosphate to said stack gas scrubber means for contact with additional $SO_2$ in said stack gases introduced thereinto, along with potassium sulfite formed in step (3) infra;
3. heating said solid potassium pyrosulfite recovered from said stack gas scrubber means to form potassium sulfite and vapors of $SO_2$ without forming any substantial amounts of potassium sulfate by introducing same into furnace means wherein is maintained a vacuum of about 25 inches of mercury and a temperature in the range from about 450° to about 550° F.; and
4. recovering from said furnace means as product the resulting $SO_2$ vapors.

7. The process of claim 6 wherein the temperature maintained in said furnace means is about 500° F.

8. A process for efficiently and economically recovering the sulfur values from the stack gases of fossil fuel power plants and the like, said stack gases containing substantial amounts of fly ash, dust, moisture and only nominal amounts of sulfur values as $SO_2$, which comprises the steps of 1. contacting said stack gases in a stack gas scrubber means with an aqueous solution of potassium phosphate, said potassium phosphate solution containing at least about one-third of its potassium values as potassium pyrophosphate;
2. separating the resulting slurry formed in said stack gas scrubber means into a solids portion and a liquids portion, said solids portion comprising precipitated potassium pyrosulfite and said liquids portion comprising unreacted potassium pyrophosphate and potassium monoorthophosphate;
3. recycling said liquids portion together with potassium carbonate formed in step (6) infra back to said stack gas scrubber means for contact with additional $SO_2$ contained in said stack gases introduced therein;
4. heating in a first furnace means said solids portion recovered from said slurry formed in said stack gas scrubber means at atmospheric pressure and in the range from about 350° to about 450° F. to convert one-third of the sulfur values therein to sulfur dioxide without any appreciable formation of potassium sulfate therein, and withdrawing said sulfur dioxide and introducing same into step (7) infra;
5. introducing the residue formed in said first furnace means comprising undecomposed potassium pyrosulfite and potassium sulfite into a first section of a second furnace means, together with a reducing material, said reducing material selected from the group consisting of carbon, coal, coke, petroleum, carbon monoxide, hydrogen, and mixtures thereof, heating the constituents in said first section of said second furnace means, at atmospheric pressure, to a temperature range of about 900° to about 1,500° F. resulting in the formation of potassium sulfide, hydrogen sulfide, and carbon dioxide;
6. introducing said potassium sulfide, hydrogen sulfide, and carbon dioxide, together with water, into a second section of said second furnace means, and maintaining said materials at atmospheric pressure therein in the temperature range of about 750° to about 850° F. to effect the formation of potassium carbonate, along with vapors of hydrogen sulfide and carbon dioxide, said potassium carbonate recycled to said gas scrubber means as recited in step (4) supra;
7. subsequently introducing hydrogen sulfide and carbon dioxide formed in step (6) supra, together with sulfur dioxide formed in step (4) supra into a third furnace means, maintaining said materials in said third furnace means in the temperature range from about 400° to about 700° F., thereby effecting the formation of elemental sulfur together with vapors of water and carbon dioxide, and recovering from said third furnace means as product said elemental sulfur; and
8. recycling said potassium carbonate formed in step (6) supra, together with the liquids fraction residue comprising potassium pyrophosphate and potassium monoorthophosphate from step (1) supra to said stack gas scrubber means for contact with additional sulfur dioxide vapors from said stack gases fed thereinto.

9. The process of claim 8 wherein the temperature in the first section of said second furnace means is maintained at about 1,400° F.

10. The process of claim 8 wherein the temperature in said second section of said second furnace means is maintained at about 800° F.

11. In the recovery of sulfur values from fossil fuel fed powerplant stack gases and the like wherein said stack gas containing only nominal amounts of sulfur values as $SO_2$ are contacted with an aqueous potassium phosphate scrubbing solution followed by regeneration of the resulting scrubber effluent to yield a rich stream of $SO_2$ eminently suitable for the recovery of the said sulfur values, the improvement wherein said scrubbing solution contains at least one-third by weight of potassium pyrophosphate and which, after absorbing the $SO_2$ values from the stack gas, immediately showers out said $SO_2$ values as potassium pyrosulfite, thereby eliminating recirculating dissolved $SO_2$ to said stack gases whereby the undesirable oxidation of dissolved $SO_2$ to the sulfate form is substantially eliminated.

12. An improved process according to claim 11 wherein said potassium phosphate solution, in addition to containing about one-third of its potassium values as potassium pyrophosphate, contains about 5 to about 10 percent of its potassium values as potassium tripolyphosphates and in amounts up to about 2 percent of its potassium values of potassium tetrapolyphosphate.

* * * * *

UNITED STATES PATENT OFFICE
CERTIFICATE OF CORRECTION

Patent No. 3,630,672                    Dated December 28, 1971

Inventor(s) John M. Potts

It is certified that error appears in the above-identified patent and that said Letters Patent are hereby corrected as shown below:

Column 1, line 36, after "Work" insert -- on the --
Column 3, delete portion beginning "In my early work" on line 18, through line 26 ending with "common potassium phosphate" and substitute therefor:
-- In my early work, potassium phosphate was selected as the absorbent because any sulfate unavoidably formed by oxidation in the process cycle would be salable as a fertilizer. In contrast, sodium phosphate would yield sodium sulfate, a material of little value. On the other hand, ammonium phosphate was not applicable because an insoluble ammonium pyrosulfite did not form easily. From the results of these early tests, I learned that common potassium phosphate, --
Column 4, line 40, after "separation" change "had" to -- has --;
  line 50, change "not" to -- no --; line 72, after "for use" delete "sulfur" and insert -- in --;
Column 5, line 39, after "heat" insert -- is --; line 68, after "The" delete "best."
Column 7, lines 13 and 14, formula should read:
  -- $3K_4P_2O_7 + 6K_2HPO_4 + 3H_2O + 6SO_2 \rightarrow 3K_4P_2O_7 + 6KH_2PO_4 + 3K_2S_2O_5\downarrow$ --;
Column 8, line 3, formula should read as follows:
  -- $3K_4P_2O_7 + 6KH_2PO_4 + 3K_2CO_3 + 6SO_2 \rightarrow 3K_4P_2O_7 + 6KH_2PO_4 + 3K_2S_2O_5\downarrow + CO_2\uparrow$ --
Column 9, line 11, delete "Specific gravity, g./ml." and substitute
  -- Analysis, g./l. --, and delete the figures opposite "1.7, 1.6, 1.4".
Column 10, line 19, change "pilot plan" to -- pilot plant --; line 52, change "0-27-3" to -- 0-27-36 --; line 53 at the beginning of the line, delete "6";
Column 12, line 4, after "Solution, %" insert -- $^d$ --;
Column 13, line 36, change "reside" to -- residue --;
Columns 13 and 14, table III, under test number 7 and opposite "As sulfate" change "1.7" to -- 1.6 --; under test 3 opposite "$K_2O$" change "97" to -- 96 --.
Claim 6, column 15, line 23, after "formed in said" insert -- stack --.
Claim 8, column 15, line 43, after "fossil fuel" insert -- fed --.

Signed and sealed this 13th day of June 1972.

(SEAL)
Attest:

EDWARD M. FLETCHER, JR.                ROBERT GOTTSCHALK
Attesting Officer                      Commissioner of Patents